United States Patent [19]
Linder et al.

[11] Patent Number: 4,964,223
[45] Date of Patent: Oct. 23, 1990

[54] DYNAMIC FEELER HEAD

[75] Inventors: Kurt Linder, Karlsruhe; Werner Gurny, Wadgassen, both of Fed. Rep. of Germany

[73] Assignee: Wegu-Messtechnik GmbH, Wadgassen, Fed. Rep. of Germany

[21] Appl. No.: 230,470

[22] Filed: Aug. 9, 1988

[30] Foreign Application Priority Data

Aug. 21, 1987 [DE] Fed. Rep. of Germany ....... 3727923
Feb. 4, 1988 [DE] Fed. Rep. of Germany ....... 3811235

[51] Int. Cl.⁵ .............................................. G01B 5/20
[52] U.S. Cl. ....................................... 33/556; 33/559; 33/561
[58] Field of Search ................... 33/551, 555, 556, 558, 33/561, 559

[56] References Cited

U.S. PATENT DOCUMENTS

| | | | |
|---|---|---|---|
| 3,869,799 | 3/1975 | Neuer et al. | 33/561 |
| 4,136,458 | 1/1979 | Bell et al. | 33/561 |
| 4,153,998 | 5/1979 | McMurtry . | |
| 4,451,987 | 6/1984 | Cusack | 33/561 |
| 4,451,988 | 6/1984 | McMurtry . | |
| 4,473,955 | 10/1984 | McMurtry | 33/561 |
| 4,535,543 | 8/1985 | Linder | 33/559 |
| 4,553,332 | 11/1985 | Golinelli et al. | 33/561 |
| 4,562,646 | 1/1986 | Dall'Aglio | 33/561 |
| 4,578,873 | 4/1986 | Klingler et al. | 33/556 |
| 4,625,417 | 12/1986 | Cusack | 33/561 |
| 4,734,994 | 4/1988 | Cusack | 33/561 |

FOREIGN PATENT DOCUMENTS 2620099 12/1976 Fed. Rep. of Germany .

*Primary Examiner*—Thomas B. Will
*Attorney, Agent, or Firm*—Wood, Herron & Evans

[57] ABSTRACT

A dynamic contact or feeler head for measuring machines and for the utilization thereof in processing machines for the solution of measurement tasks. The feeler head includes a centrally inserted feeler which is deflectable in at least two coordinate directions, which is constructed so as to be tiltable about a tilting axis which is always equally distant from the feeler and always located in the same plane, and with an electromechanical, inductive or optical signal transmission.

15 Claims, 3 Drawing Sheets

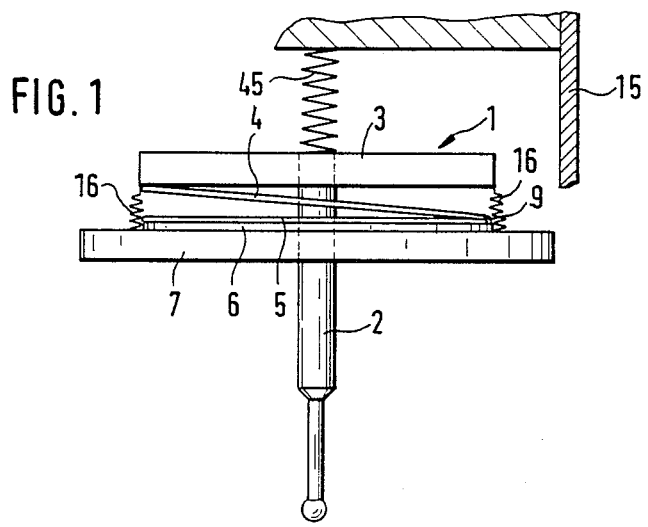
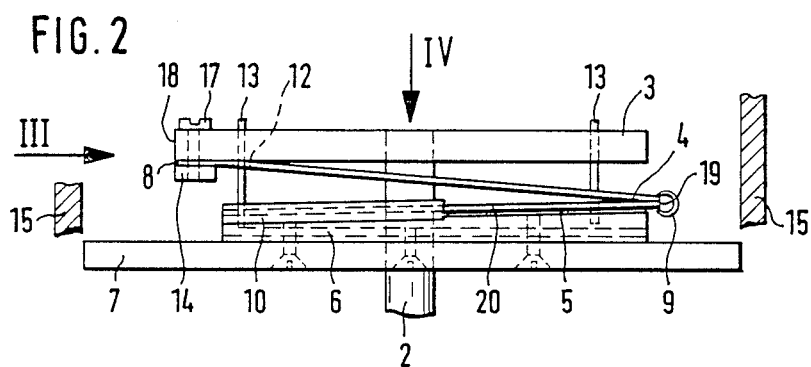
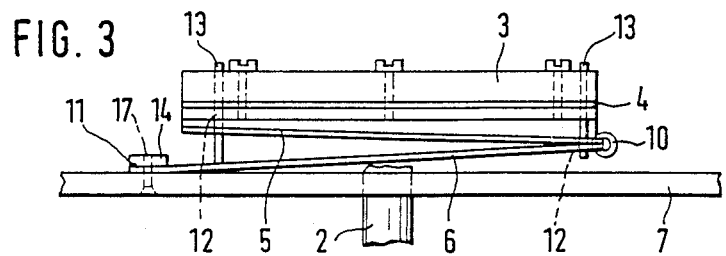
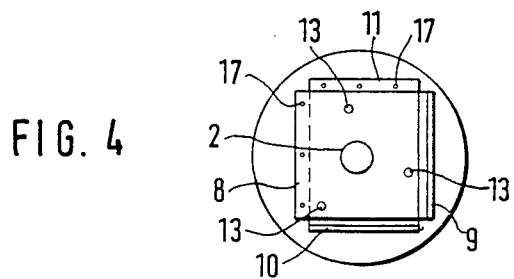

DYNAMIC FEELER HEAD

BACKGROUND OF THE INVENTION

1. Field of the Invention

The present invention relates to a dynamic contact probe or feeler head for measuring machines and for the utilization thereof in processing machines for the solution of measurement tasks, incorporating a centrally inserted feeler which is deflectable in at least two coordinate directions, which is constructed so as to be tiltable about a tilting axis which is always equally distant from the feeler and always located in the same plane, and with an electromechanical, inductive or optical signal transmission.

2. Discussion of the Prior Art

From the disclosure of German Patent No. 32 34 851 there has become known a dynamic contact or feeler head for measuring machines of the type which is under consideration, in which there is provided a packet of five superimposed positioned plates or lamina which are equipped with equally lengthy lever arms, and which are hingedly interconnected along their side edges so as to maintain a path or flow of force in a predetermined manner. The superimposedly arranged plates of the known feeler head are constituted from rigid metal discs. The hinge joints along the side edges are formed by leaf springs which are arranged to extend at right angles with the plates. It has been ascertained with regard to this known feeler head, that the demand for components is relatively high, and the individual parts must be extremely carefully assembled subsequent to relatively complex and precise individualized manufacture in order to be able to offer the desired precision in measurement by the feeler head. In addition to the foregoing, it is possible that the deflection of the feeler rod through presently two plates on the leaf spring hinge joints can be carried under only a relatively high force requirement.

From the disclosure of German Patent No. 26 20 099 there has become known a measuring head which is equipped with sensors or measuring feelers which are displaceable in three coordinate directions, and wherein the leaf spring hinge joints are equipped with leaf springs which are connected in sequence.

From the disclosure of U. S. Pat. No. 4,553,332 there has become known a sensing or measuring probe for the measurement of linear dimensions, which is equipped with a carrier and possesses a measuring feeler on a supportive movable arm. A single component provides the connection between the carrier and the movable arm. This single component possesses a first, a second and an intermediate section, which are separated from each other through the interposition of cutouts and bore holes, and which are in connection with each other through the intermediary of relatively narrow connectors or webs. This unitary single or unitary component has the core or nucleus of the feeler installation structure relatively voluminous and is constructed technologically expensive and complicated. The measuring contacting is possible by means of contact points on movable sections and necessitate a constant spring support. Although the above-mentioned member appears to be large and voluminous, notwithstanding the numerous cutouts and bore holes, it forms an unstable structure in various planes and directions.

SUMMARY OF THE INVENTION

Accordingly, commencing from the above-mentioned state-of-the-technology, it is an object of the present invention to provide a dynamic contact probe or feeler head of the above-mentioned type which is constructed from only a few individual or single components, and which evidences well defined as well as relatively light deflecting forces in the X and Y coordinate directions, as well as a good reproduceability in the movements of the entire feeler installation, and whereby there is avoided any displacement of the individual plates.

The foregoing object is inventively attained in that the contact probe or feeler head possesses a packet of five superimposed positioned plates, discs or the like which are equipped with equally lengthy arms, of which the three plates which are arranged intermediate the outer discs or plates are constituted of leaf springs, and which are hingedly connected with each other and with the outer plates in such a manner whereby the flow or path of the force upon the deflection of the feeler in the X and Y coordinate directions extends from the first disc through the hinge joint to the second leaf spring disc, from the second leaf spring disc through the oppositely located hinge joint to the third leaf spring disc, from the latter through a hinge joint which is offset by 90° to the fourth leaf spring disc, from the latter through an again oppositely located hinge joint to the fifth disc or plate.

Thus, the particular advantage of this object may be found in that the three plates which are located intermediate the two outermost discs are constructed as leaf springs which are hingedly or articulatedly interconnected with each other along their outer edges. This configuration eliminates the need for the leaf spring hinge joints which are usually arranged along the side edges for the deflection of the feeler. Moreover, the overall constructional height of the oppositely arranged discs is extraordinarily low because of the interposed leaf springs. The leaf spring plates or discs are fixedly interconnected along their side edges which serve for their attachment through welding; for example, by means of laser welding, which prevents their displacement with respect to each other and assists in their stiffening in the deflecting direction. Through the utilization of pins which engage into bore holes formed in the superimposed mounted leaf springs, in an advantageous manner there takes place a constant centering of the contact head subsequent to a sensing or measuring sequence.

The particular advantage of the unitarily constructed spring block, as set forth hereinbelow, resides in that the entire spring block for the deflection of the feeler in the X and Y coordinate directions is constituted from a single piece. Inasmuch as the cuts or incisions which extend in parallel in the X and Y planes are extremely thin when formed by the arcing-erosion process or by a laser cutting process, the entire spring block is constructed in a height of only a few millimeters. Any displacement of the individually leaf spring discs or plates among each other is basically precluded. The single-piece block is a relatively rigid structure which allows for the precise deflection of the feeler in the coordinate directions, and moreover, is resistant to torsion.

Pursuant to a further feature of the invention, the lowermost articulated or hinge joint can be formed as a connector which is fastened to the fifth disc through the intermediary of screws.

A particularly advantageous modification is imparted to the contact probe or feeler head when, on the surface of the fifth disc or plate facing towards the leaf spring discs, there are preferably fixedly attached at least three hard metal lugs or pivots with the interposition of an insulation, which are arranged on a common annulus, and through-bores coaxial with the hard metal lugs in all superimposed arranged discs, and which lugs contact against hard metal balls pressed into the through-bores in the inoperative position of the feeler head. Hereby, the hard metal lugs can be adhesively fastened on the surface of the fifth disc. Moreover, the hard metal balls can be provided with a surface coating of an electrically conductive material; for instance, such as nickel or gold. In addition thereto, cross-bores can be provided in the hard metal lugs. At the contact of the balls against the hard metal lugs, there is formed a closed electrical contact, which is noted in the evaluating or plotting unit. As soon as the feeler pin contacts against a workpiece, and as a result thereof is imparted a deflection by means of the leaf spring discs, there is interrupted the contact between ball and a receiving lug, which leads to the generating of a signal in the plotting unit. For example, cable connectors can be inserted into the cross-bores in the hard metal lugs, whereby an electrical connection is possible between the hard metal lugs and the plotting unit.

Finally, the first disc or plate can be connected with a pick-up or receiving member for the feeler pin, whose cylindrical body projects through openings which are arranged centrally in the discs, whereas the head disc or plate is subjected to the action of a spring which supports itself against the housing of the feeler head.

BRIEF DESCRIPTION OF THE DRAWINGS

Reference may now be had to the following detailed description of exemplary embodiments of the invention, taken in conjunction with the accompanying drawings; in which:

FIG. 1 illustrates a generally simplified and diagrammatic representation of a contact probe or feeler head device with hinge jointed or articulatedly interconnected leaf spring plates;

FIG. 2 illustrates a side view of the feeler head of FIG. 1, shown on an enlarged scale;

FIG. 3 illustrates the feeler head device in a side view rotated through 90°, in accordance with the direction of the arrow III in FIG. 2;

FIG. 4 illustrates a plan view of the feeler head in accordance with the direction of arrow IV in FIG. 3;

DETAILED DESCRIPTION

Figure 5:
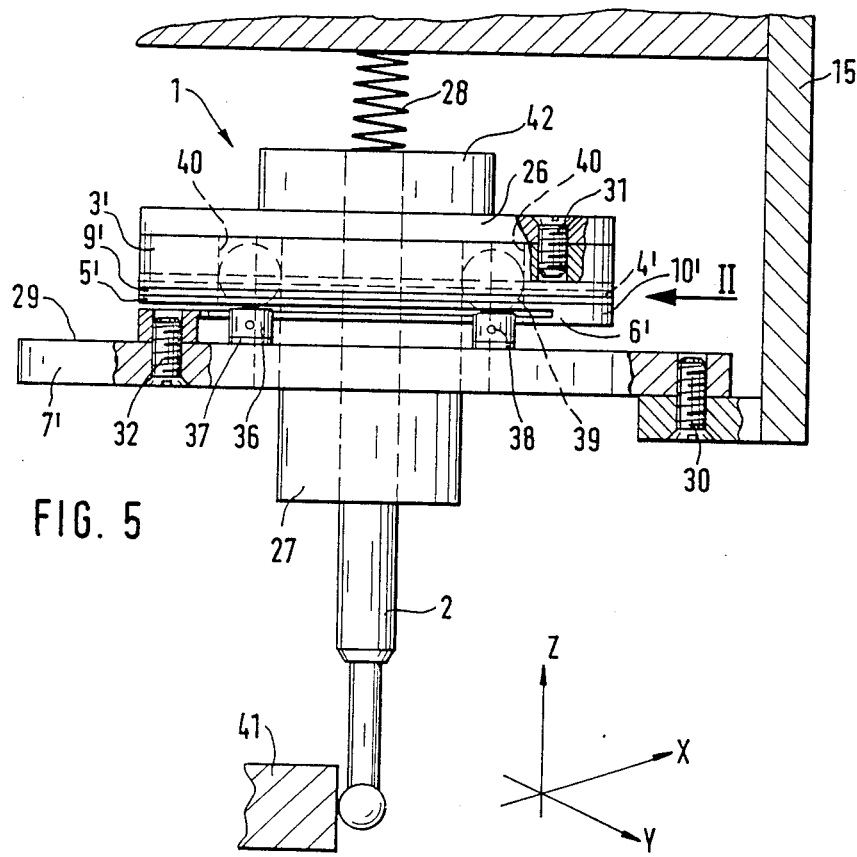
FIG. 5 illustrates a side view of a simplified representation of a feeler head device with single-piece articulated leaf spring plates.

The contact probe or feeler head 1 is built into a housing 15 and possesses a centrally arranged feeler 2. The entire feeler head 1 is constituted of a packet of five superimposed arranged plates 3, 4, 5, 6, 7 or respectively 3', 4', 5', 6', 7', which are interconnected along their side edges through hinged or articulated joints 8, 9, 10, 11 or respectively 8', 9' 10', 11'. This signifies that during the deflection of the feeler 2 in one of the coordinate directions X or Y, the packet of plates of the feeler head 1 will tip about a tilting axis which extends along the side edges of the plates.

In more specific detail, the assembly of the feeler head 1 pursuant to FIGS. 1 through 4 is undertaken in such a manner that an upper fixed disc or plate 3 of rectangular cross-section, will receive the second disc 4 along one side edge, which disc 4 is constructed as a leaf spring. This leaf spring disc 4 is fastened through the intermediary of a connector 14 to the upper plate 3 by means of screws 17. This fastening concurrently forms the first articulated joint 8 with its tilting axis extending along the side edge 18 of the disc 3. Located opposite this articulated joint 8 is a second articulated joint 9, which is formed as a cylinder which extends along the side edge 19 of the leaf spring 4. This cylinder is slit open in parallel with its longitudinal axis, such that the side edge 19 of the leaf spring disc 4 can be clamped into the articulated joint. The third disc or plate, in turn, 5 is again constructed as a leaf spring, and similarly inserted into the cylinder of the articulated joint 9 in addition to the leaf spring disc 4, and simultaneously has its side edge welded together with the side edge of the leaf spring disc 4. Consequently, the two leaf spring discs or plates 4 and 5 are clamped into a single, common, cylindrically configured articulated joint 9. Offset by 90° relative to the linkage 9 is, in turn, an articulated joint 10 extending along the side edge 20 of the leaf spring disc 5, which is also constructed as a cylinder, and which is slit open along the side edge 20 of the leaf spring disc or plate 5.

Within this slit in the cylinder there is clamped the side edge of the further leaf spring disc 6, which at the end thereof located opposite the articulated joint 10 is articulatedly attached through a connector 14 by means of screws 17 to the lower plate 7 to form lower articulated joint 11. The side edges of the leaf spring discs 5 and 6 in the linkage 10 are similarly secured against displacement with each other through welding; for example, laser welding.

By means of this arrangement of the leaf spring disc 4, 5 and 6 being inserted intermediate the two outer rigid discs or plates 3 and 7 as a packet, and being articulately joined to each other, there is obtained the following path or flow of force upon the deflection of the feeler 2 in the X and Y coordinate directions:

From the upper rigid disc or plate 3, the force extends through the articulated joint 8 to the leaf spring disc 4 and from this leaf spring 4 through the articulated joint 9 which is located directly opposite the articulated joint 8, to the further leaf spring disc 5. From the latter, the path of the force extends further through the articulated joint 10, which is offset by 90° relative to the articulated joint 9, to the next leaf spring disc 6. From there, the path of the force extends across the last articulated joint 11, which is again located opposite the articulated joint 10, to the lower rigid disc or plate 7.

From the exemplary representation there can be ascertained that the lever arms from the feeler 2 are always of equal length towards all four sides. The feeler 2 always tilts over a side edge of a plate or leaf spring disc extending in parallel with the X or Y coordinate directions. This allows for an extremely accurate tilting in the coordinate directions. Through the intermediary of the leaf spring discs or plates 4, 5 and 6 which are arranged between the two outer plates 3 and 7, it is possible to achieve a relatively soft or smooth tilting over of the feeler through the tilting axes, whereby through a suitable selection of elastic tempering of the leaf spring discs 4, 5, 6, there can be varied the tilting moment.

In order to produce a defined deflecting force in the X and Y coordinate directions, in accordance with exemplary embodiment of FIG. 1, the superimposed arranged discs or plates 3, 4, 5, 6, and 7 are maintained in their inoperative or resting position by means of four tensioned springs 16 which are arranged at the corner points of the plates.

In order to, after every contacting of the feeler 2 against a workpiece and a corresponding deflecting cycle for the contact or feeler head, be able to always again afford the same initial position for the individual plates, there are fastened in the outer disc 3 a total of three mutually dispersed arranged pins 13, which project downwardly in a direction towards the outer plate 7 and which engage into the mutually coaxially arranged bore holes 12 in the leaf spring plates 4, 5 and 6. These bore holes 12 are each of a larger diameter relative to those of the pins 13, so as not to influence the tilting of the feeler 2 through the applicable articulated joints.

The return movement of the feeler 2 is carried out by means of the leaf spring plates 4, 5 and 6 in the articulated joints 8, 9, 10 and 11, and is supported by the tension springs 16 which are attached at the four corner points.

The deflection of the feeler 2 in the Z coordinate direction is carried out in opposition to the force of an inserted spring 45 which supports itself in the housing 15 of the feeler head 1. Hereby, the deflection of the feeler 2 in the Z coordinate direction can be limited upwardly by a stop provided in the housing 15.

The configuration of the plates 4, 5 and 6 as leaf springs, and their special arrangement at angles of 90° relative to each other, affords the considerable advantages that the leaf spring plates themselves form relatively lengthy resilient or spring lever arms, in that their stressing is always carried out in the direction of the fibers of the material. This produces the result, that upon any collisions of the feeler 2 with a stationary object, there is encountered a resilient or elastic deflection, without the occurrence of any permanent deformation of the leaf spring plates 4, 5 and 6 or their articulated joints 8, 9, 10 and 11.

As a result of the foregoing, the effectiveness and the functional capability is decisively improved in an inventive manner, especially in comparison with the feeler head pursuant to German Patent No. 32 34 851.

In place of the welds of the leaf spring plates 4, 5 and 6, within the scope of the invention there can, however, be also provided other permanent connections, such as; for example, rivets, screws, adhesive media or the like. The same is applicable to the connection of the side edges of the leaf spring plates 4 and 6 with the outer discs or plates 3 and 7. Hereby, instead of the screw connection, there can also be selected a welding, riveting or adhesive connection. It is decisive that the plates 3, 4, 5, 6 and 7 may not be displaceable relative to each other during operation, so that it is possible to always have repeatable or reproduceable deflections of the feeler 2. The slitted cylinders have, in addition thereto, the function of forming a protective cap for the side edges of the leaf plates and to assume a stiffening action, such that the deflection will always take place exactly in one direction and there are inhibited any indefinite lateral or cross-wise movements of the leaf springs.

With respect to the three pins there can additionally be commented, that these do not only allow for a centering of the leaf spring plates 4, 5 and 6 and their unobstructed superimposed positioning subsequent to the effected deflection, but also form a three-point support contact for the plates 3, 4, 5, 6 and 7.

Figure 6:
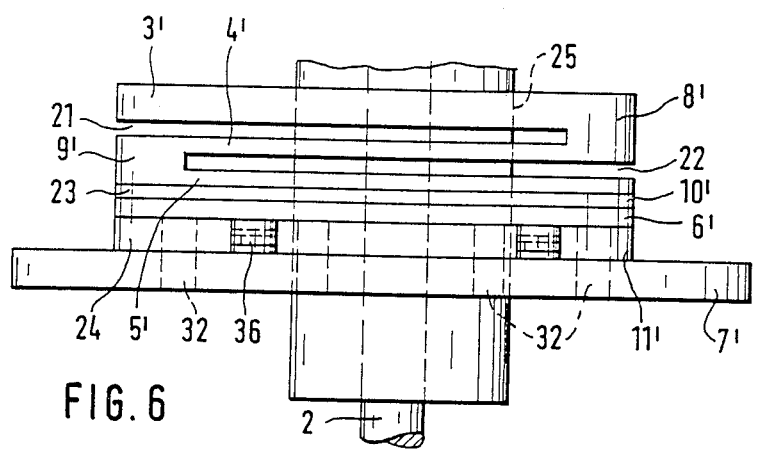
FIG. 6 illustrates a side view of the feeler head device in the direction of arrow II in FIG. 5.
Figure 7:
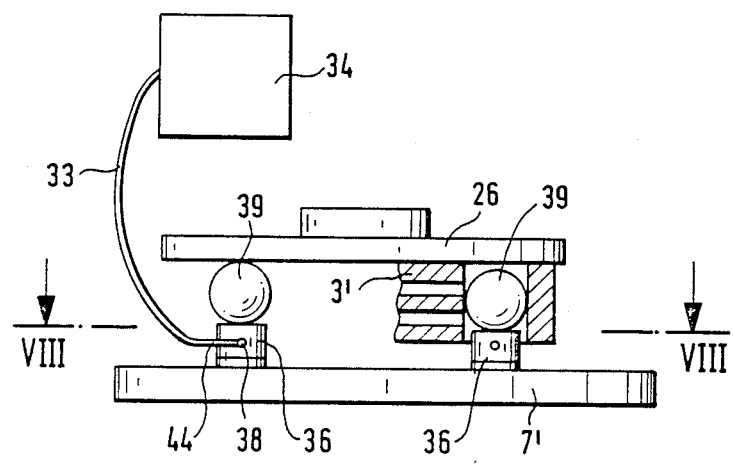
FIG. 7 illustrates a detail of the feeler head of FIG. 5, shown partly in section.
Figure 8:
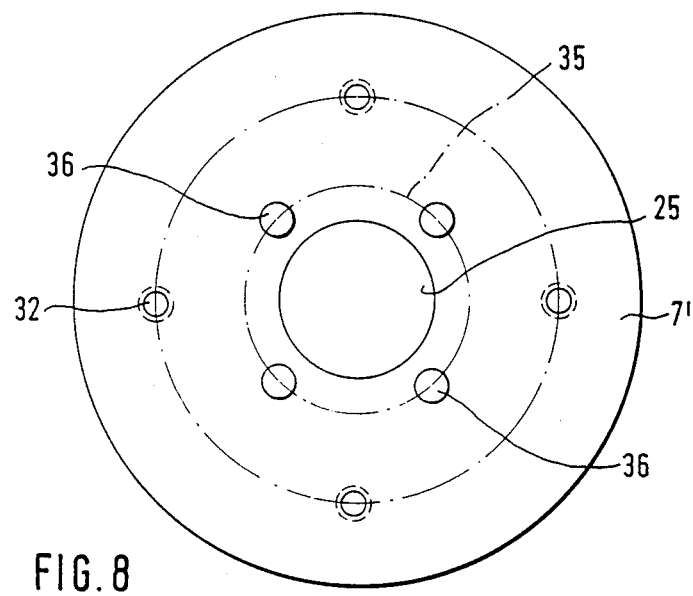
FIG. 8 illustrates a plan view of the lower plate of the feeler head taken along line VIII—VIII in FIG. 7.

In accordance with FIGS. 5 through 8 of the drawings, there is represented an advantageous and experimentally proven alternative embodiment of the contact or feeler head 1.

In this alternative configuration, the feeler head 1 is assembled into a housing 15 and connected with this housing 15 through the intermediary of screws 30. The feeler head 1 possesses a centrally positioned feeler 2 which is inserted in cylindrical part 26 of a receiving member 27 which has its head plate 42 standing under the effect of a spring 28 in the Z coordinate direction, wherein the spring supports itself against the housing 15. The entire feeler head 1 consists of a packet of five superimposed arranged plates 3', 4', 5' 6', and 7' which are integrally interconnected along their side edges through articulated joints 8', 9', 10' and 11'. This signifies that upon the deflection of the feeler 2 into one of the X or Y coordinate directions, the packet of plates of the feeler head 1 will tip about a tilting axis which extends along the side edges of the plates.

In detail, the erection of this feeler head 1 pursuant to FIGS. 5 through 8 is undertaken in such a manner, that an upper stationary plate 3' of rectangular cross-section is unitarily connected through the articulated joint 8' along one side edge with the second leaf spring plate 4'. The leaf spring disc 4' is, in turn, again unitarily connected with the further leaf spring plate 5' through the linkage 9'. Finally, there is provided a further unitary connection between the leaf spring plate 5' and the leaf spring plate 6' through the articulated joint 10' which is turned by 90° relative to the articulated joint 9'. Finally, a further articulated joint 11' is connected to the leaf spring plate 6' which joint lies 180° opposite articulated joint 10'. This formed spring block is constructed from a single piece in that cuts or incisions 21, 22, 23 and 24 are produced intermediate the individual plates. These cuts are preferably produced by an arcing erosion process although it is also possible to employ a laser cutting process. Consequently, it is possible to provide an only extremely thin cut of extreme precision, as a result of which there is produced a plate packet of leaf spring plates which are oriented precisely in parallel with each other. The total constructional height of this spring packet which is formed from spring plates; for example, consists of only 6 to 7 mm. The articulated joints 8' and 9' which are arranged offset opposite each other by 180°, as well as the articulated joints 10' and 11' which are offset relative thereto by 90°, allow for an exact orienting of the feeler head in the X and Y coordinate direction. The plates 3', 4', 5', 6' and 7' each possess a central aperture 25 into which there engages the cylindrical part 27 of the receiving member 26 for the feeler 2. The receiving member 26 is connected with the upper plate 3' by means of screws 31. The connection of the leaf springs 3', 4', 5' and 6' with the lower plate 7' is, in turn, again carried out by means of screws 32, which are inserted into the articulated joint 11'.

Arranged on the surface 29 of the lower disc 7' uniformly dispersed about a common annulus 35 are a number of hard metal lugs 36, preferably, three equidistantly spaced lugs, although four are illustrated in the exemplary embodiment, which are fixedly connected with the plate 7' through an adhesive and with the interposition of an insulation 37. Cross-bores 38 are provided in the hard metal lugs 36, into which there can be inserted a cable connector or a cable pin 44 in an electrically contacting manner, and which is connected through an electrical connecting line 33 with a measured value plotting installation 34.

The hard metal lugs 36, in the resting or inoperative position of the feeler head 1, are in contact with hard metal balls 39. These balls 39 are pressed into through-bores 4 provided in the plates 3', 4', 5' and 6', which bores are arranged in a coaxial orientation relative to the hard metal lugs 36. The hard metal balls 39 possess a contact mantle surface; for example, constituted of nickel or gold. At a contacting of the feeler 2 against a workpiece 41, the feeler 2 is imparted deflection in the X and Y direction, as a result of which a contact is released between a hard metal lug 36 and a hard metal ball 39. Thereby, the electrical contact is interrupted and a signal is generated in the plotting unit 34, which signal represents a measured value.

From the representation of the spring packet in FIGS. 5 through 8, there can be ascertained that the lever arms are always the same length from the feeler 2 towards all four sides. The feeler 2 always tilts over a side edge of a disc or leaf spring plate 3' in parallel with the X and Y coordinate directions. This affords an extremely precise tilting over in directions of the coordinates. The return movement of the feeler 2 is, in essence, effected always through the leaf spring plates 3', 4', 5' and 6' in the articulated joints 8', 9', 10' and 11'. The deflection of the feeler 2 in the Z coordinate direction is carried out in opposition to the force of an inserted spring 28, which supports itself on the housing 15 of the feeler head 1. Furthermore, the deflection of the feeler 2 in the Z-direction can be upwardly limited by the provision of a stop in the housing 15.

The configuration of the plates 3', 4', 5' and 6' and their special arrangement at an angle of 90° relative to each other affords the advantage that the leaf spring plates in themselves form relatively lengthy spring or resilient lever arms and, on the other hand, their stressing is always effected in the direction of the fibers of the material. This has as a result, that upon collisions of the feeler 2 with a stationary object there is encountered a resilient deflection, without causing any permanent deformation of the leaf spring plates or their articulated joints. Consequently, the effectiveness and the functional capability are decisively improved in an inventive manner in comparison with the current state-of-the-technology.

What is claimed is:

1. A dynamic feeler head for measuring machines and for utilization in processing machines for the solving of measurement tasks, including a centrally inserted feeler which is deflectable in at least two coordinate directions, said feeler being tiltable about a tilting axis which is always equally distant from the feeler and always located in the same plane, and signal transmission means responsive to the deflection of the feeler comprising:

a packet of five superimposed arranged plates equipped with equally lengthy lever arm, two of said plates being an upper outer plate and a lower outer plate, respectively, three of said plates, arranged intermediate the outer plates, being leaf springs which are articulately joined with each other and with the outer plates along longitudinal edge regions of the plates such that the path or flow of force during the deflection of the feeler in the X and Y coordinate directions extends from the upper outer plate through an articulated joint to the first leaf spring plate, from the first leaf spring plate through an oppositely located articulated joint to the second leaf spring plate, from the second leaf spring plate through a further articulated joint, which is offset by 90°, to the third leaf spring plate, and from said third leaf spring plate through a further oppositely located articulated joint to the lower outer plate; and cylinder means slit along a longitudinal cylinder axis for clamping said articulated joints of the leaf spring plates.

2. A dynamic feeler head as claimed in claim 1, wherein the leaf spring plates are joined together at the articulated joints by welds therealong.

3. A dynamic feeler head as claimed in claim 1, wherein said leaf spring plates each possess at least one mutually coaxially arranged through-bore; and a pin fixedly connected with one of said outer plates engaging into said bore.

4. A dynamic feeler head as claimed in claim 1, wherein said leaf spring plates are articulately joined to the outer plates through connectors which are screwed or riveted thereto.

5. A dynamic feeler head as claimed in claim 1, wherein said feeler in the Z coordinate direction is linearly movable along the Z axis opposite the action of the leaf spring plates.

6. A dynamic feeler head as claimed in claim 1, wherein the superimposed plates are maintained in their resting position by four springs which are arranged at the plate corners and which are subjected to tensile loads.

7. A dynamic feeler head as claimed in claim 1, wherein the upper outer plate includes a receiving member for the feeler in, said receiving member including a cylindrical member engaging through openings centrally arranged in the plates, and a head plate being subjected to the biasing action of a spring which is supported on a housing of the feeler head.

8. A dynamic feeler head for measuring machines and for utilization in processing machines for the solving of measurement tasks, including a centrally inserted feeler which is deflectable in at least two coordinate directions, said feeler being tiltable about a tilting axis which is always equally distant from the feeler and always located in the same plane, and signal transmission means responsive to the deflection of the feeler, comprising:

a unitary structure constituted from a single block having a plurality of cuts therein to define an upper outer plate and first, second and third plate-like resilient leaf spring members;

a lower outer plate, the leaf spring plates being interposed between the upper and lower outer plates to define a packet of five superimposed arranged plates equipped with equally lengthy lever arm, the three leaf spring plates being articulately joined with each other and with the outer plates along longitudinal edge regions of the plates such that the path or flow of force during the deflection of the feeler in the X and Y coordinate directions extends from the upper outer plate through an articulated joint to the first leaf spring plate, from the first leaf spring plate through an oppositely located articulated joint to the second leaf spring, from the second leaf spring plate through a further articulated joint, which is offset by 90°, to the third leaf spring plate, and from said third leaf spring plate through a further oppositely located articulated joint to the lower outer plate;

a plurality of heard metal lugs fixedly attached on the surface of the lower outer plate facing toward the leaf spring plates with the interposition of an insulation, said lugs being arranged spaced about a common annulus;

through-bores being formed in said superimposed plates coaxially with said lugs, said lugs engaging in said bores; and hard metal balls pressed into said through bores and being contacted by said lugs in a rest position of the feeler head.

9. A dynamic feeler head as claimed in claim 8, wherein the hard metal lugs are adhesively attached to the surface of the lower outer plate.

10. A dynamic feeler head as claimed in claim 8, wherein the hard metal balls possess a surface coating of an electrically-conductive material.

11. A dynamic feeler head as claimed in claim 8, wherein cross-bores are formed in said hard metal lugs.

12. A dynamic feeler head as claimed in claim 8, the cuts between the three leaf spring plates being disposed in the X and Y planes, and the articulated joints connecting the leaf spring plates being connecting webs constituted from material remaining from the cuts in the block and extending perpendicular the X and Y planes and between the leaf spring plates such that the leaf spring plates each extend in the X and Y planes in a rest position of the feeler.

13. A dynamic feeler head as claimed in claim 12, wherein the cuts in said block are produced in an arcing 14. A dynamic feeler head as claimed in claim 12, wherein the cuts in said block are produced by a laser cutting process.

15. A dynamic feeler head as claimed in claim 12, wherein the articulated joint between said third leaf spring plate and said lower outer plate is a connector which is fastened through screws to said lower outer plate.

* * * * *

UNITED STATES PATENT AND TRADEMARK OFFICE
CERTIFICATE OF CORRECTION

PATENT NO. : 4,964,223
DATED : October 23, 1990
INVENTOR(S) : Kurt Lindner and Werner Gurny It is certified that error appears in the above-identified patent and that said Letters Patent is hereby corrected as shown below:

Col. 8, Line 41, "in" should deleted

Col. 10, Line 16, after "arcing" add --erosion process--

Signed and Sealed this

Twenty-fifth Day of May, 1993

Attest:

MICHAEL K. KIRK

Attesting Officer

Acting Commissioner of Patents and Trademarks